United States Patent
K N Sai Krishna et al.

(10) Patent No.: US 12,066,996 B2
(45) Date of Patent: Aug. 20, 2024

(54) GARBAGE COLLECTION BASED ON METADATA INDICATING UNMODIFIED OBJECTS

(71) Applicant: TERADATA US, INC., San Diego, CA (US)

(72) Inventors: Rangavajula K N Sai Krishna, Hyderabad (IN); Chandrasekhar Tekur, Hyderabad (IN)

(73) Assignee: Teradata US, Inc., San Diego, CA (US)

( * ) Notice: Subject to any disclaimer, the term of this patent is extended or adjusted under 35 U.S.C. 154(b) by 43 days.

(21) Appl. No.: 18/054,642

(22) Filed: Nov. 11, 2022

(65) Prior Publication Data
US 2024/0160617 A1    May 16, 2024

(51) Int. Cl.
*G06F 16/23*    (2019.01)
*G06F 12/02*    (2006.01)

(52) U.S. Cl.
CPC ...... *G06F 16/2329* (2019.01); *G06F 12/0253* (2013.01); *G06F 16/2365* (2019.01)

(58) Field of Classification Search
None
See application file for complete search history.

(56) References Cited

U.S. PATENT DOCUMENTS 10,346,297 B1 * 7/2019 Wallace ............... G06F 3/0608
11,256,720 B1 * 2/2022 Hoffman ........... G06F 16/24554
2012/0296867 A1 * 11/2012 Berkvens-Matthijsse ............ G06F 3/0608 707/610
2013/0086131 A1    4/2013 Hunt et al.
2016/0147449 A1 * 5/2016 Andrei ............... G06F 16/2308 707/814
2018/0011852 A1 * 1/2018 Bennett ............... G06F 16/2228
2020/0285616 A1 * 9/2020 George ............... G06F 16/178

OTHER PUBLICATIONS

Probabilistic Filters by Example downloaded Sep. 9, 2022 (4 pages).
Fan et al., Cuckoo Filter: Practically Better Than Bloom, 2014 (13 pages).
Wikipedia, Cuckoo filter last edited Jul. 21, 2022 (3 pages).

* cited by examiner

*Primary Examiner* — Alex Gofman
*Assistant Examiner* — Umar Mian
(74) *Attorney, Agent, or Firm* — Trop Pruner & Hu P.C.

(57) ABSTRACT

In some examples, a database system accesses a plurality of objects in a remote object store. In response to a query to change data in a first object of the plurality of objects, the database system specifies the first object prior to the change as a first version of the first object, and creates a second version of the first object after the change. The database system maintains metadata identifying unmodified objects of the plurality of objects, and during a garbage collection process when deciding whether to remove a given object of the plurality of objects, accesses the metadata to determine whether the given object has been modified, and prevents removal of the given object in response to determining that the given object is unmodified.

20 Claims, 4 Drawing Sheets

GARBAGE COLLECTION BASED ON METADATA INDICATING UNMODIFIED OBJECTS

BACKGROUND

A relational database management system (DBMS) stores databases that include collections of logically related data arranged in a predetermined format, such as in tables that contain rows and columns. To access the content of a table in a database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

In other examples, object stores can be used to store objects that are usually larger in size than rows of a table in a relational DBMS. The object stores can be provided in a cloud that is accessible over a network, for example.

BRIEF DESCRIPTION OF THE DRAWINGS

Some implementations of the present disclosure are described with respect to the following figures.

Figure 1:
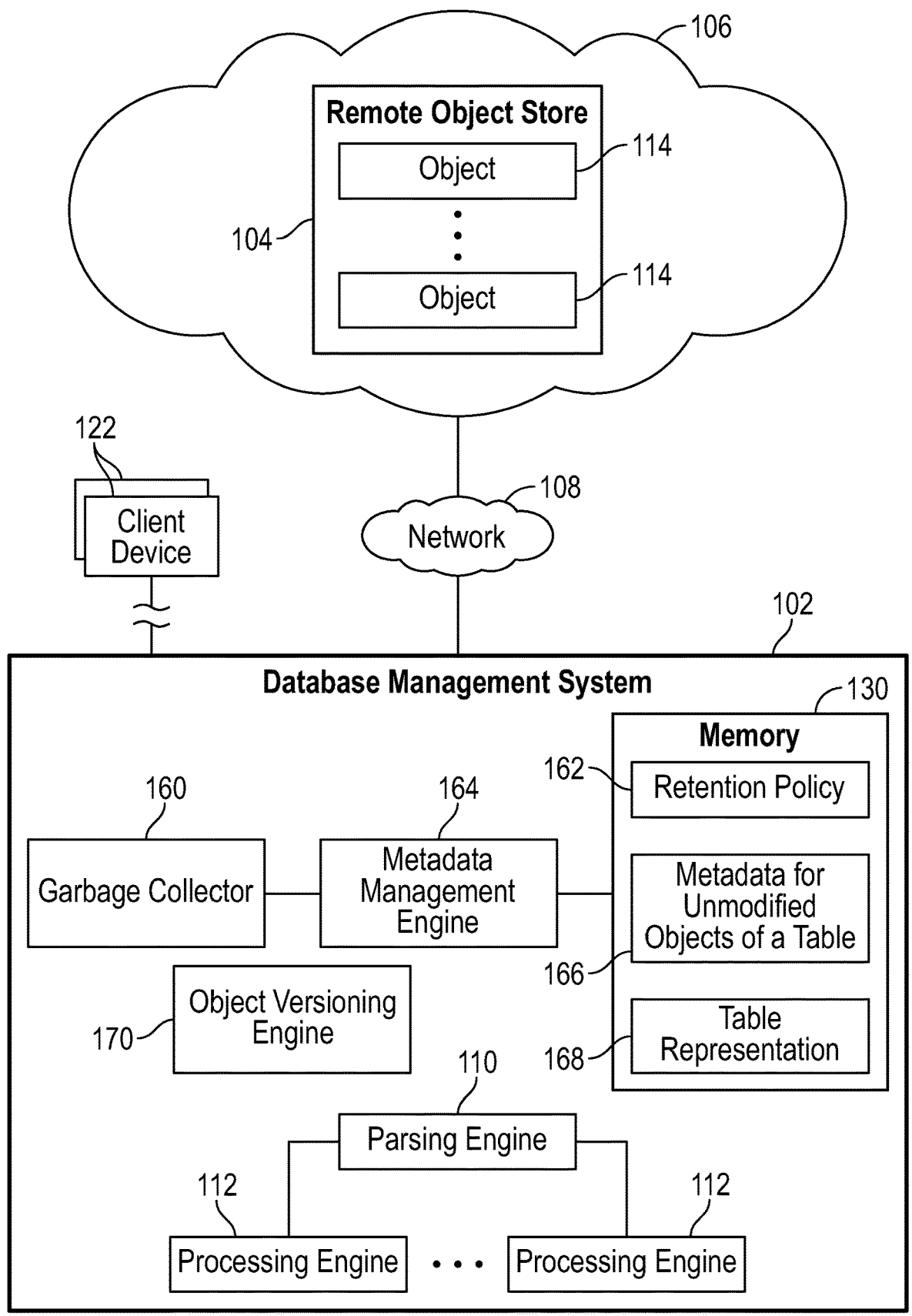
FIG. 1 is a block diagram of an arrangement including a remote object store and a database management system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

FIG. 1 is a block diagram of an example arrangement that includes a database management system (DBMS) 102 and a remote object store 104. In some examples, the remote object store 104 is an object store that stores objects 114. As used here, an "object" can refer to any separately identifiable or addressable unit of data.

The remote object store 104 can be of any of various different types of object stores. For example, the remote object store 104 can be according to any of the following: Simple Storage Service (S3) from AMAZON WEB SERVICES (AWS), Google Cloud Storage, Microsoft AZURE, and so forth. In alternative examples, the object store 104 does not have to be in a cloud, but rather can be within a data center or part of any other computing environment.

In some examples, the remote object store 104 can be accessible in a cloud 106. A "cloud" can refer to any infrastructure, including computing, storage, and communication resources, that can be accessed remotely by user devices over a network, such as a network 108 shown in FIG. 1. Alternatively, the object store 104 can be provided in a data center or in any other computing environment.

The network 108 can include a public network (e.g., the Internet), a local area network (LAN), a wide area network (WAN), a wireless network (e.g., a wireless local area the network or WLAN, a cellular network, etc.), or any other type of network.

Traditionally, a DBMS stores data of tables in a block-based storage, in which data is stored as blocks that are smaller in size than objects of object stores. A "table" can refer to a relational table of a database created to store specific data records.

In some examples, a block-based storage can include disk-based storage devices, solid state storage devices, and so forth. The block-based storage can be connected to the DBMS over a relatively high-speed link, such that the DBMS can access (read or write) data in a relational database with relatively low input/output (I/O) latency (i.e., the delay between a time that a request is submitted and a time that the request is satisfied at the storage is relatively low). The block-based storage can be considered a local storage of the DBMS, since the DBMS is able to access the block-based storage with relatively low I/O latency.

In some examples of the present disclosure, instead of or in addition to coupling block-based storage (that store base tables) to the DBMS 102, the DBMS 102 can work with the remote object store 104, which can be provided in the cloud 106 or another remote computing environment. In such examples, local block-based storage is not used with the DBMS 102 to store base tables.

The objects 114 of the remote object store 104 can have variable sizes, and each object can have a size between 10 megabytes (MB) and 100 MB. In other examples, an object can have a smaller or larger size. An object in an object store is typically larger in size than data records (e.g., rows, tables, etc.) stored in a local block-based storage.

The objects 114 can include objects of multiple tables, where each object can include rows of a given table. The rows of the given table may be contained in multiple objects. In some cases, an object can include rows of multiple tables.

When responding to a database query, the DBMS 102 can access (write or read) data of the remote object store 104, rather than table data in a relational table (or relational tables) of a local block-based storage.

In some examples, in response to modification of data in objects during write operations, multiple versions of the modified objects may be created. More specifically, a write operation that modifies data in a given object does not cause the modification of the given object in place. For the write operation, the current version of the given object is not modified, but a new version of the given object is created in which the data modification is performed. A data modification can refer to an insertion of data, a deletion of data, or an update of data. The modification of the given object results in logical deletion of the earlier version of the given object, which is subject to removal as part of garbage collection.

Maintaining different versions of a modified object allows for access of data at different points in time contained in the different object versions of the modified object. For example, an object may be modified at time t1 in a write operation, such that a first version of the object contains data prior to time t1, and a second (later) version of the object contains data after t1. In other words, the first version of the object contains data prior to the modification at time t1, while the second version of the object contains the modified data as modified at time t1.

A time travel query can be submitted to the DBMS 102 to access data of an object in a given time range (e.g., the latest version of data prior to a specified time). A "time travel query" can refer to any query that seeks data at a time that can be prior to a current time of the DBMS 102. In response to the time travel query, the DBMS 102 can access a version of the object containing data in the given time range.

The DBMS 102 can also store a retention policy 162, such as in a memory 130 of the DMBS 102. The retention policy 162 governs retention of data according to one or more criteria. As an example, the retention policy 162 can specify that versions of objects having timestamps that are greater than or equal to a specified retention time are to be kept in the remote object store 104, while versions of objects with timestamps earlier than the specified retention time are to be removed from the remote object store 104. A timestamp of an object can refer to a time at which the object was created or modified.

As another example, the retention policy 162 can specify that a specified quantity (e.g., 2 or more) of versions of each object is to be kept in the remote object store 104. If a quantity of versions of a given object exceeds the specified quantity, then earlier version(s) of the given object is (are) removed from the remote object store 104 to keep the quantity of versions of the given object at the specified quantity.

In some examples, the removal of versions of objects, such as according to a retention policy or in response to a request, can be performed by a garbage collector 160 in the DBMS 102. The garbage collector 160 can be implemented using a hardware processing circuit, or a combination of machine-readable instructions and a hardware processing circuit that executes the machine-readable instructions.

A hardware processing circuit can include any or some combination of a microprocessor, a core of a multi-core microprocessor, a microcontroller, a programmable integrated circuit, a programmable gate array, a digital signal processor, or another hardware processing circuit.

The garbage collector 160 performs a garbage collection process that identifies data that can be removed, such as versions of objects that have been logically deleted and fall outside the retention policy 162. A version of an object "falls outside" a retention policy if the version of the object does not meet a retention criterion in the retention policy 162. Logical deletion of a version of an object is performed in response to a modification of the object that produces an earlier version of the object (that is not modified but that is logically deleted) and a later version of the object (that is modified). A version of the object falls outside the retention policy 162 if the version of the object has a timestamp earlier than a specified retention time. As another example, the version of the object falls outside the retention policy 162 if a total quantity of versions of the object exceeds a specified quantity in the retention policy 162, and the version of the object is a candidate for removal (e.g., the version of the object is the earliest version of the multiple versions of the object).

Queries received by the DBMS 102 can include queries that specify database operations to be performed on tables.

In some examples, a table can contain data stored in multiple objects of the remote object store 104. The table refers to the multiple objects. A representation of the table can be stored in the DBMS 102, such as in the memory 130 or in a persistent storage (not shown) of the DBMS 102, but the data of the table is not stored in the DBMS 102; rather, the data of the table is contained in the multiple objects stored in the remote object store 104. The table can refer to the multiple objects, such that a query specifying a database operation on the table would result in access of the data in the multiple objects referred to by the table.

A query received by the DBMS 102 to modify data of a given table can cause modification of data in a first subset of objects referred to by the given table, while a second subset of objects referred to by the given table is not to be modified. A "subset of objects" can include a single object or plural objects.

As an example, a query can specify modification of a collection of rows of the given table. The collection of rows of the given table is contained in the first subset of objects referred to by the table, but not in the second subset of objects referred to by the table. In response to such query, data in the first subset of objects referred to by the table is modified, while data in the second subset of objects referred to by the table remains unmodified.

If object versioning is supported by the DBMS 102, then the DBMS 102 can cause multiple versions of the objects of the first subset of objects to be created. However, since the objects of the second subset of objects remain unmodified, a single version of each object in the second subset of objects remains.

During a garbage collection process performed by the garbage collector 160, it can be difficult to identify which objects to remove. For example, the objects the garbage collection process may seek to remove can be objects with timestamps earlier than a specified retention time. Unmodified objects may have timestamps earlier than the specified retention time, since no modification has occurred in the unmodified objects. If unmodified objects are removed by the garbage collection process, then loss of data may result, since no version of such unmodified objects exist.

In accordance with some implementations of the present disclosure, the DBMS 102 includes a metadata management engine 164 that maintains metadata 166 for unmodified objects of a table. An "engine" can refer to a hardware processing circuit or a combination of a hardware processing circuit and machine-readable instructions. The metadata 166 identifies the unmodified objects of the table.

In some examples, the metadata 166 can include fingerprints of the unmodified objects. A "fingerprint" can be computed by applying a fingerprint function (e.g., a hash function or another type of function) on the content of an object (or a portion of the content of the object). A "hash function" can refer to a function that maps data of arbitrary size to a fixed-size value (referred to as a "hash value").

The fingerprints (each fingerprint of a specified fingerprint length, e.g., fp bits) can provide identifications of respective objects. A fingerprint of a given object is in the metadata 166 indicates that the given object is unmodified.

In some examples of the present disclosure, the garbage collector 160 consults the metadata 166 during a garbage collection process to decide whether to remove a given object. The garbage collector 160 accesses the metadata 166 to determine whether the given object has been modified, and prevents removal of the given object in response to determining, based on the metadata 166, that the given object is unmodified.

In some examples, different instances of the metadata 166 can be maintained by the metadata management engine 164 for respective different tables. In other examples, the metadata 166 can include information identifying unmodified objects for multiple tables.

Figure 2:
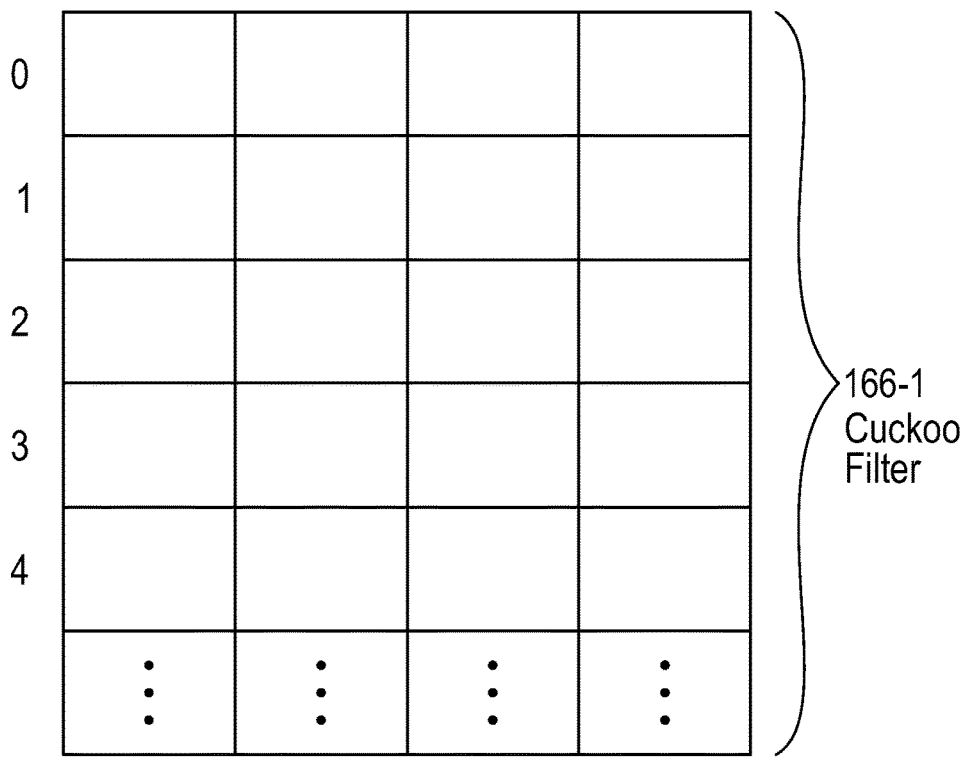
FIG. 2 is a block diagram of a probabilistic data structure identifying unmodified objects according to some examples.

In some examples, the metadata 166 includes a probabilistic data structure that has entries containing fingerprints corresponding to the unmodified objects. In more specific examples, the probabilistic data structure includes a cuckoo filter 166-1, as shown in FIG. 2.

A cuckoo filter is a space-efficient probabilistic data structure that is used to test whether an element is a member of a set, which in the present examples is a test of whether an object is modified or unmodified. The cuckoo filter can return false positives (i.e., the cuckoo filter can indicate that a fingerprint of an unmodified object is in the cuckoo filter when that is not true). However, the cuckoo filter does not return false negatives (i.e., the cuckoo filter does not falsely indicate that a fingerprint of an object is not in the cuckoo filter—in other words, if the cuckoo filter indicates that the fingerprint of the object is not in the cuckoo filter, then that the object is definitely not an unmodified object).

It is also possible to delete existing items (fingerprints of objects) from the cuckoo filter. Since the cuckoo filter stores fingerprints, and not content of objects, the cuckoo filter is storage space efficient and does not consume excessive storage space.

A cuckoo filter 166-1 uses an N-way set-associative hash table (N 2) based on cuckoo hashing of the content of objects to store the fingerprints of the objects. For a given object, x, the cuckoo hashing calculates:

$$h_1(x)=\text{hash}(x),$$

$$h_2(x)=h_1(x)\oplus(\text{hash}(\text{fingerprint}(x))),$$

where hash( ) is a hash function that produces a hash value. In some examples, the hash function, hash( ), is different from the fingerprint function, fingerprint(x), used to compute the fingerprint of the given object, x. For example, the hash function, hash( ), produces a hash value with a length that can be different from the length of the fingerprint of x. The length of the hash value produced by hash( ) depends on the quantity of entries in the cuckoo filter.

The hash values $h_1(x)$ and $h_2(x)$ specify two candidate buckets of the cuckoo filter 166-1 into which the given object, x, can be inserted. In the example of FIG. 1, buckets are depicted as rows of the cuckoo filter 166-1. Buckets 0, 1, 2, 3, 4, etc., of the cuckoo filter 166-1 are shown. Each bucket has a number of entries. In the example of FIG. 1, each bucket has four entries (shown as four columns of the cuckoo filter 166-1). In other examples, each bucket can have a different quantity (one or more) of entries.

Each of the entries can store a respective fingerprint of an object. For example, fingerprints f1, f2, and f3 can be stored in the respective entries of the cuckoo filter 166-1.

In some examples, when inserting fingerprint, fingerprint (x), of the given object, x, into the cuckoo filter, the metadata management engine 164 can identify an empty entry in a bucket specified by $h_1(x)$ or $h_2(x)$, and if there is an empty entry, the metadata management engine 164 inserts the given object, x, into the identified empty entry of the cuckoo filter. If neither bucket specified by $h_1(x)$ or $h_2(x)$ is empty, the metadata management engine 164 can randomly select one of the two buckets specified by $h_1(x)$ or $h_2(x)$ and select an occupied entry (presently occupied by a fingerprint of another object, y, for replacement with the fingerprint of x. The fingerprint for the other object, y, can be relocated to a different entry of the cuckoo filter.

For example, if y were kicked out of bucket i (into which x was inserted), then the metadata management engine 164 can relocate the other object, y, to a bucket j computed as follows:

$$j=i\oplus\text{hash}(\text{fingerprint}(x)).$$

The cuckoo filter 166-1 is populated during insert operations or any other operations in response to SQL queries that generate new objects. When a new object is added to the remote object store 104, a fingerprint is added to a corresponding entry in the cuckoo filter 166-1 as part of metadata maintenance.

A lookup of the cuckoo filter 166-1 can be performed in the following manner. For example, to lookup if the fingerprint for an object, z, is in the cuckoo filter 166-1, the metadata management engine 164 calculates the fingerprint of z, fingerprint(z), and calculates hash functions identifying two buckets as follows:

$$h_3(z)=\text{hash}(z),$$

$$h_4(z)=h_3(z)\oplus\text{hash}(\text{fingerprint}(z)).$$

The metadata management engine 164 then determines if the fingerprint of z matches fingerprints in any of the entries of the two buckets specified by $h_3(z)$ and $h_4(z)$. If a match is detected, the metadata management engine 164 returns a first output indicating that the fingerprint of z is present in the cuckoo filter 166-1. If no match is detected, the metadata management engine 164 returns a different second output indicating that the fingerprint of z is not present in the cuckoo filter 166-1.

Similarly, to delete the fingerprint for the object, z, from the cuckoo filter 166-1, the metadata management engine 164 calculates the fingerprint of z, fingerprint(z), and calculates hash functions identifying two buckets as follows:

$$h_3(z)=\text{hash}(z),$$

$$h_4(z)=h_3(z)\oplus\text{hash}(\text{fingerprint}(z)).$$

The metadata management engine 164 then determines if the fingerprint of z matches fingerprints in any entry (the "matched entry") of the entries of the two buckets specified by $h_3(z)$ and $h_4(z)$. If a match is detected, the metadata management engine 164 removes the fingerprint of z from the matched entry of the cuckoo filter 166-1.

During a garbage collection process, the garbage collector 160 has to decide whether a given object (e.g., an older version of an object) is to be removed. The garbage collector 160 determines whether the given object has been modified by requesting the metadata management engine 164 to access the cuckoo filter 166-1 to determine whether or not the fingerprint of the given object is in the cuckoo filter 166-1. If the fingerprint of the given object is not in the cuckoo filter 166-1, then that indicates that the given object is not an unmodified object, and thus can be removed in the garbage collection process.

Storing fingerprints of unmodified objects in the cuckoo filter 166-1 (instead of storing fingerprints of modified objects) rules out the possibility of wrong deletion of unmodified objects due to the possibility of producing false positives by the cuckoo filter 166-1.

Although FIG. 1 shows an example where the metadata management engine 164 is separate from the garbage collector 160, in other examples, the metadata management engine 164 can be part of the logic of the garbage collector 160.

The DBMS 102 also includes an object versioning engine 170 that can create new versions of objects as objects are modified. For example, when object, x, is modified, such as in response to a database query, the object versioning engine 170 sets the current version of x as a first version of x, and creates a second version of x in which the data modification according to the database query is applied.

In a specific example, a multi-versioned table T1 can have 6,000 rows. In other examples, a table can have a different quantity of rows. A "multi-versioned table" can refer to a table where multiple versions of objects referred to by the table can be maintained.

It can be assumed that each object can contain the data of 1,000 rows of table T1. In such an example, the 6,000 rows of table T1 are contained in 6 different objects $o_1$, $o_2$, $o_3$, $o_4$, $o_5$ and $o_6$. In some examples, a table representation 168 of objects can be maintained for each table. If there are multiple tables, there can be multiple table representations each containing references (e.g., pointers, handles, etc.) to respective objects that contain data of rows of a respective table.

In some examples, the table representation 168 is in the form of a hierarchical representation of objects referred to by a table. When the DBMS 102 receives a database query that specifies an operation on one or more tables, the DBMS 102 can consult one or more table representations 168 to determine which objects 114 of the remote object store 104 are involved in the operation on the one or more tables.

Figure 3:
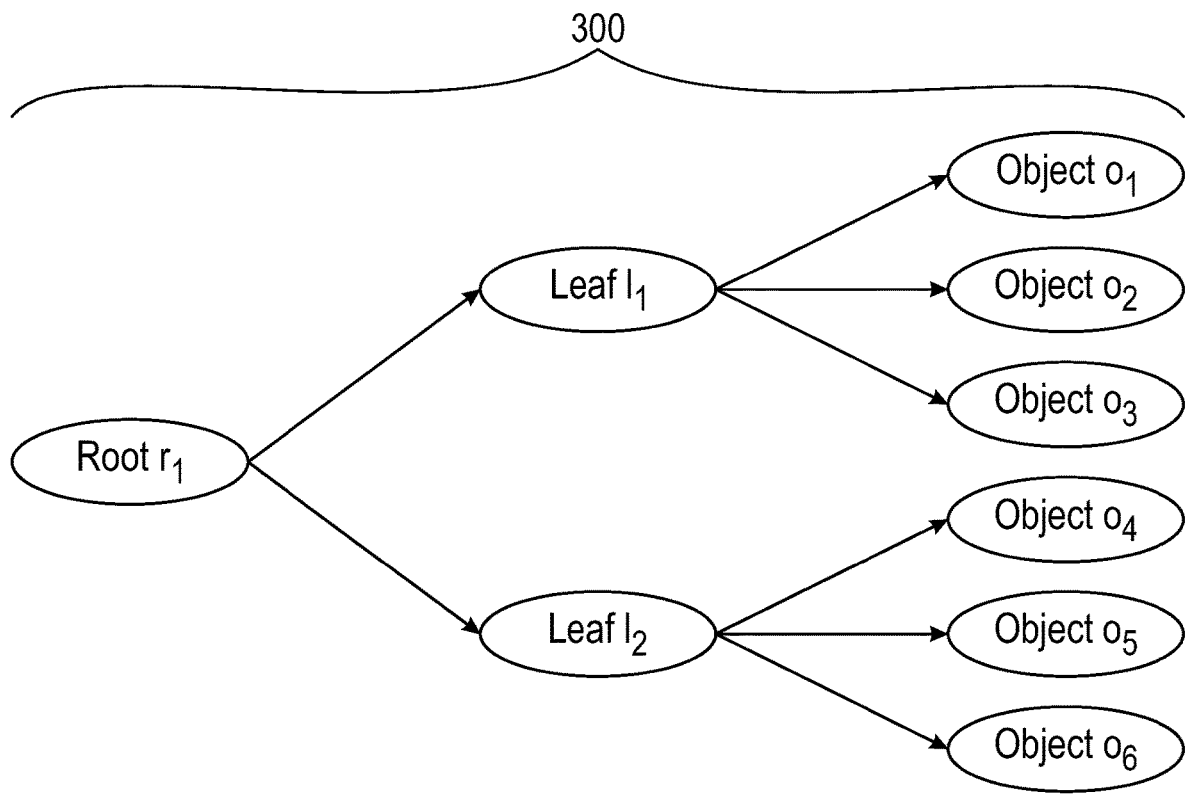
FIG. 3 is a block diagram of a tree representation of objects referred to by a table, according to some examples.

In some examples, the hierarchical representation of objects can be in the form of a tree representation, such as a tree representation 300 of objects of table T1 shown in FIG. 3. In other examples, other types of representations of objects referred to by a table can be employed.

The tree representation 300 includes a root node $r_1$ that references two leaf nodes $l_1$ and $l_2$. The leaf node $l_1$ references objects $o_1$, $o_2$, $o_3$, and the leaf node $l_2$ references objects $o_4$, $o_5$, $o_6$. In other examples, a leaf node can reference a different quantity of objects. For example, if a leaf node references two objects, then the root node $r_1$ would reference three leaf nodes each referencing two corresponding objects containing data of rows of table T1.

Initially, when objects $o_1$, $o_2$, $o_3$, $o_4$, $o_5$ and $o_6$ are not yet modified, the metadata management engine 164 can store in the metadata 166 (e.g., the cuckoo filter 166-1) fingerprints of all the unmodified objects $o_1$, $o_2$, $o_3$, $o_4$, $o_5$ and $o_6$.

In an example, a modification operation (e.g., an update or delete operation) on table T1 may update objects $o_1$, $o_3$, and $o_5$. As a result, there would be updated object versions $o_1^1$, $o_3^1$, and $o_5^1$, updated leaf node versions $l_1^1$ and $l_2^1$, and an updated root node version $r_1^1$, in addition to the current object versions $o_1$, $o_3$ and $o_5$, the current leaf node versions $l_1$ and $l_2$, and the current root node version $r_1$.

Figure 4:
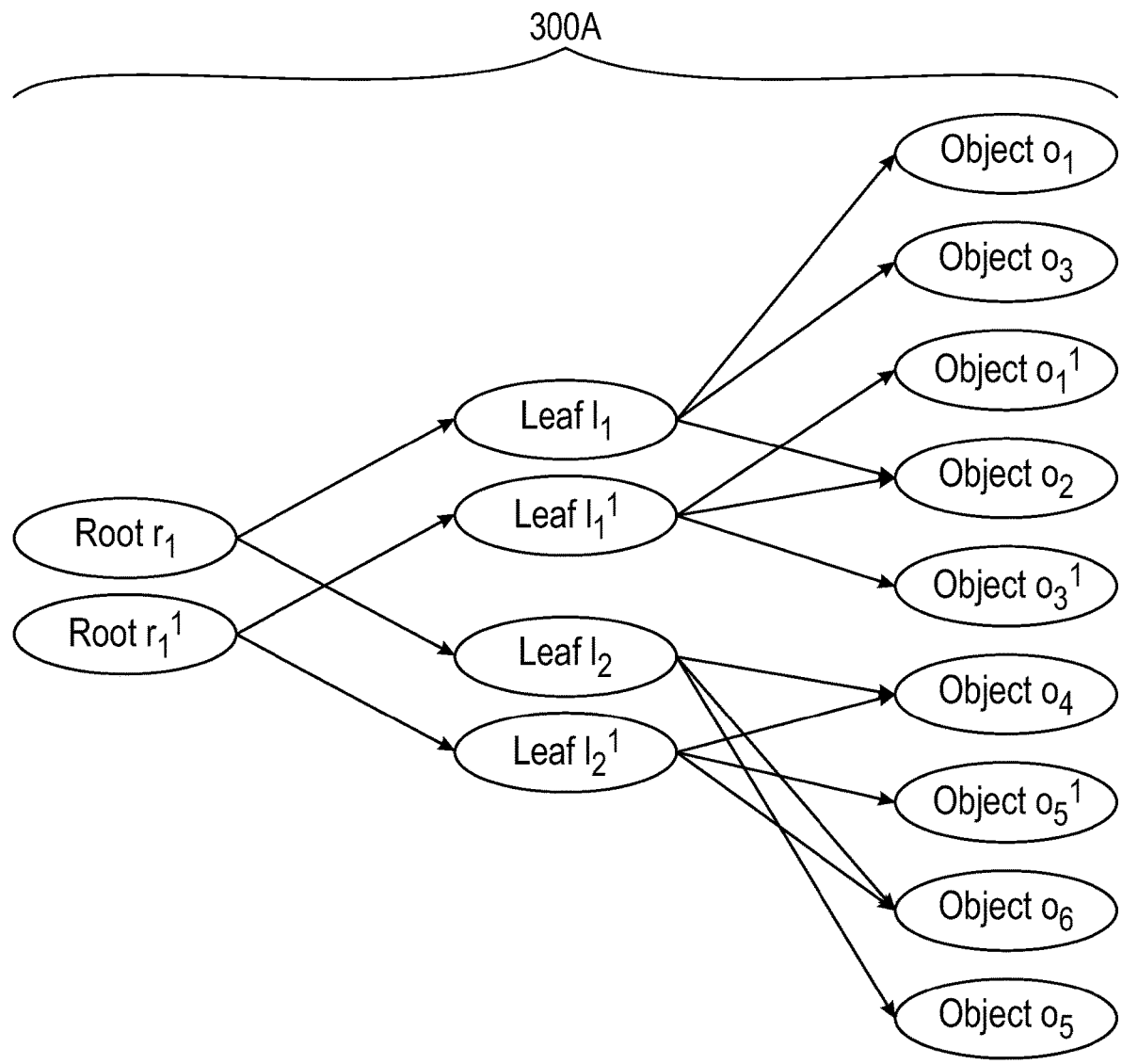
FIG. 4 is a block diagram of a tree representation of objects referred to by a table, after modification of some of the objects, according to some examples.

FIG. 4 shows an updated tree representation 300A that include multiple versions of the following: $o_1$, $o_3$, and $o_5$, $o_1^1$, $o_3^1$, and $o_5^1$, $l_1$ and $l_2$, $l_1^1$ and $l_2^1$, $r_1$, and $r_1^1$. Note that objects $o_2$, $o_4$, and $o_6$ remain unmodified.

As a result of the modifications of $o_1$, $o_3$, and $o_5$, the metadata management engine 164 updates the metadata 166 (e.g., the cuckoo filter 166-1) to remove fingerprints of $o_1$, $o_3$, and $o_5$. However, the fingerprints of unmodified objects $o_2$, $o_4$, and $o_6$ remain in the metadata 166 (e.g., the cuckoo filter 166-1).

In an example, if the retention policy 162 specifies that only one version is to be retained at a point in time, the garbage collector 160 can remove older object versions as part of a garbage collection process. To identify candidate objects corresponding to older versions for removal, the garbage collector 160 cannot just remove the older root node version $r_1$ and all the objects associated with the older root node version $r_1$ in FIG. 4, as doing so would result in deletion of unmodified objects $o_2$, $o_4$, and $o_6$, which are also referred to by the new root node version $r_1^1$.

Deleting objects $o_2$, $o_4$, and $o_6$ as part of the garbage collection process would result in loss of data in the unmodified objects $o_2$, $o_4$, and $o_6$.

To avoid data loss, the garbage collector 160 should remove only the older root node version $r_1$, the older leaf node versions $l_1$ and $l_2$, and the older object versions $o_1$, $o_3$, $o_5$ (assuming that such nodes are not in use during removal). The metadata 166 is used to keep track of all the unmodified objects ($o_2$, $o_4$, and $o_6$) so that the garbage collector 160 can avoid removing the unmodified objects during the garbage collection process. The garbage collector 160 can access the tree representation 300A to determine what objects are to be removed for a given table, such as table T1. Consulting the metadata 166 avoids removal of unmodified objects.

Although the foregoing refers to one older object version and one new object version for a modified object, in further examples, there may be more than two versions of a modified object. For example, an object $o_1$ may have the following versions: $o_1^1$, $o_1^2$, $o_1^3$, $o_1^4$, and $o_1^5$, where $o_1^1$ is the oldest version of the object $o_1$, and $o_1^5$ is the newest version of the object $o_1$. The retention policy 162 may specify that object versions with timestamps earlier than a specified retention time can be removed. If object versions $o_1^1$, $o_1^2$ have timestamps earlier than the specified retention time and $o_1^3$, $o_1^4$, $o_1^5$ have timestamps later than the specified retention time, then the garbage collector 160 can remove object versions $o_1^1$, $o_1^2$ but keep $o_1^3$, $o_1^4$, $o_1^5$ in a garbage collection process.

As further shown in FIG. 1, the DBMS 102 includes a parsing engine 110 that is able to process database queries (e.g., SQL queries), including data definition language (DDL) statements and data manipulation language (DML) statements. The parsing engine 110 can include an optimizer (not shown) that can produce a query plan including database operations to be executed for processing a given database query.

In addition to the parsing engine 110, the DBMS 102 includes multiple processing engines 112 to execute database operations of a query plan. The multiple processing engines 112 are able to execute in parallel with one another, and are able to access, in parallel, different data portions (e.g., different objects 114, different portions of objects 114) of the remote object store 104. Each processing engine 112 is considered a Unit of Parallelism (UOP) that is able to execute in parallel (e.g., concurrently or simultaneously) with one or more other UOPs. Each UOP is able to perform a local relational operation, such as a join operation (e.g., to join data from multiple tables), a data aggregation operation (to aggregate multiple pieces of data into an aggregate value, such as a sum, maximum, minimum, average, median, etc.), and so forth.

In other examples, the DBMS 102 can include just one processing engine 112.

In some examples, the multiple processing engines 112 include respective different computer nodes. In other examples, the multiple processing engines 112 include respective different processors or cores of multi-core processors.

In further examples, it is possible that some of the objects 114 can be retrieved into one or more cache memories of the DBMS 102, for quicker access during database operations.

Database queries can be submitted by one or more client devices 122 to the DBMS 102. The client devices 122 can include any or some combination of the following: a server computer, a desktop computer, a notebook computer, a tablet computer, a smartphone, a game appliance, a vehicle, a household appliance, or any other type of electronic device.

Figure 5:
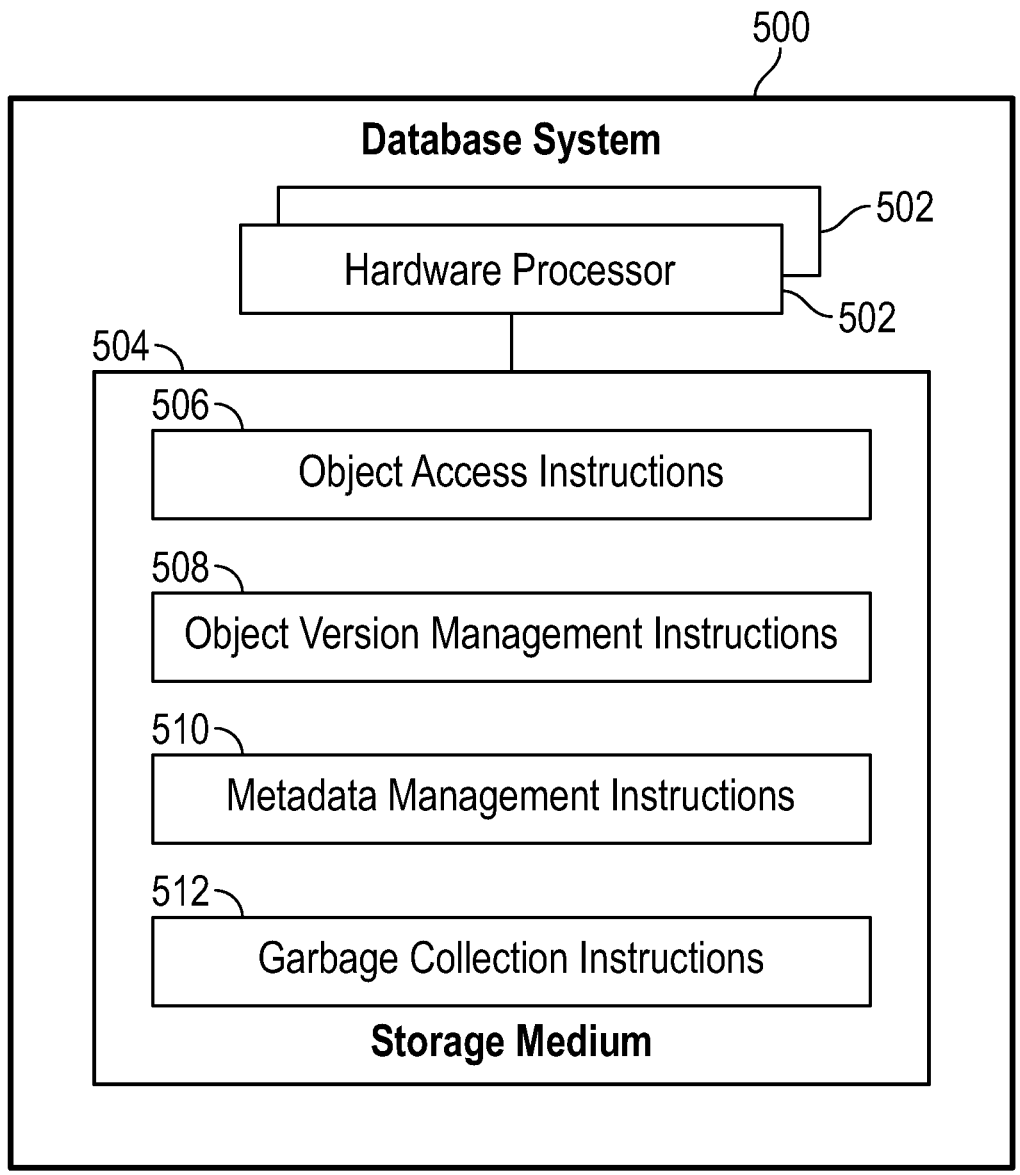
FIG. 5 is a block diagram of a database system according to some examples.

FIG. 5 is a block diagram of a database system 500 according to some examples. An example of the database system 500 is the DBMS 102 of FIG. 1.

The database system 500 includes one or more hardware processors 502. A hardware processor can include a microprocessor, a core of a multi-core microprocessor, a microcontroller, a programmable integrated circuit, a programmable gate array, or another hardware processing circuit.

The database system 500 includes a non-transitory machine-readable or computer-readable storage medium 504 that stores machine-readable instructions executable on the one or more hardware processors to perform respective tasks.

The machine-readable instructions include object access instructions 506 to access objects in the remote object store 104 of FIG. 1. The object access instructions may be executed by the processing engines 112 of FIG. 1, for example.

The machine-readable instructions include object version management instructions 508 to manage versions of objects as objects are modified. The object version management instructions 508 can be part of the object versioning engine 170 of FIG. 1, for example. In response to a query to change data in a given object, the object version management instructions 508 can specify the given object prior to the change as a first version of the given object, and create a second version of the given object after the change.

The machine-readable instructions include metadata management instructions 510 to maintain metadata identifying unmodified objects of the plurality of objects. The metadata management instructions 510 can be part of the metadata management engine 164 of FIG. 1, for example.

The machine-readable instructions include garbage collection instructions 512 to, during a garbage collection process when deciding whether to remove a given object of the plurality of objects, access the metadata to determine whether the given object has been modified, and to prevent removal of the given object in response to determining that the given object is unmodified. The garbage collection instructions 512 can be part of the garbage collector 160 of FIG. 1, for example.

A storage medium (e.g. 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a database system to:
   access a plurality of objects in a remote object store;
   in response to a query to change data in a first object of the plurality of objects, change the first object by specifying the first object prior to the change as a first version of the first object, and creating a second version of the first object after the change;
   maintain metadata identifying unmodified objects of the plurality of objects, wherein the metadata comprises a probabilistic data structure comprising entries containing fingerprints of the unmodified objects, wherein a fingerprint of the fingerprints is produced based on applying a fingerprint function on content of a respective unmodified object;
   based on changing the data in the first object, update the probabilistic data structure by removing a fingerprint of the first object from the probabilistic data structure; and
   during a garbage collection process when deciding whether to remove any object of the plurality of objects:
      access the probabilistic data structure to determine whether an object has been modified,
      determine that the first object has been modified based on determining that the fingerprint of the first object is not in the probabilistic data structure,
      determine that a second object of the plurality of objects is unmodified based on determining that a fingerprint of the second object is in the probabilistic data structure, and
      prevent removal of the second object based on determining from the probabilistic data structure that the second object is unmodified.

2. The non-transitory machine-readable storage medium of claim 1, wherein the fingerprint function is a hash function.

3. The non-transitory machine-readable storage medium of claim 1, wherein the determining that the first object has been modified comprises computing the fingerprint of the first object and determining that the computed fingerprint of the first object is not in the probabilistic data structure.

4. The non-transitory machine-readable storage medium of claim 1, wherein the probabilistic data structure comprises a cuckoo filter.

5. The non-transitory machine-readable storage medium of claim 1, wherein the instructions upon execution cause the database system to determine that the first object has been modified based on:
   computing a first hash value based on applying a first hash function on the first object,
   computing a second hash value based on applying a second hash function on the first object, wherein the first hash value specifies a first bucket of the probabilistic data structure, and the second hash value specifies a second bucket of the probabilistic data structure, computing the fingerprint of the first object by applying the fingerprint function on the first object, and determining that the computed fingerprint of the first object is not present in the first bucket and the second bucket.

6. The non-transitory machine-readable storage medium of claim 1, wherein the instructions upon execution cause the database system to:

allow removal of the first version of the first object in response to determining that the first object has been modified and the first version of the first object satisfies a removal criterion.

7. The non-transitory machine-readable storage medium of claim 6, wherein the removal criterion is based on a retention policy for the plurality of objects.

8. The non-transitory machine-readable storage medium of claim 5, wherein the fingerprint function is different from each of the first hash function and the second hash function.

9. The non-transitory machine-readable storage medium of claim 1, wherein the instructions upon execution cause the database system to:

maintain a hierarchical representation of the plurality of objects, wherein the garbage collection process removes objects based on the hierarchical representation of the plurality of objects.

10. The non-transitory machine-readable storage medium of claim 9, wherein the hierarchical representation of the plurality of objects comprises a tree representation of the plurality of objects, the tree representation comprising nodes representing the plurality of objects and higher level nodes referring to the nodes representing the plurality of objects.

11. A database system comprising:

one or more processors; and a non-transitory storage medium storing instructions executable on the one or more processors to:

in response to a query to access a table, access a plurality of objects containing data of the table, wherein the plurality of objects are stored in a remote object store;

in response to a query to change data in a first object of the plurality of objects, change the first object by specifying the first object prior to the change as a first version of the first object, and creating a second version of the first object after the change;

identify unmodified objects of the plurality of objects;

maintain metadata identifying the unmodified objects, wherein the metadata comprises a probabilistic data structure including entries containing fingerprints of the unmodified objects;

add the fingerprints of the unmodified objects to the probabilistic data structure by computing indicators of locations where the fingerprints are to be added, each indicator of the indicators based on content of a respective unmodified object of the unmodified objects; and during a garbage collection process when deciding whether to remove a given object of the plurality of objects, access the metadata to determine whether the given object has been modified, and prevent removal of the given object in response to determining that the given object is unmodified.

12. The database system of claim 11, wherein a fingerprint of the fingerprints is produced based on applying a fingerprint function on content of a respective unmodified object, and wherein the instructions are executable on the one or more processors to, during the garbage collection process:

determine that the first object has been modified based on determining that the fingerprint of the first object is not in the probabilistic data structure; and determine that a second object of the plurality of objects is unmodified based on determining that a fingerprint of the second object is in the probabilistic data structure.

13. The database system of claim 12, wherein the instructions are executable on the one or more processors to determine that the first object has been modified based on:

computing a first hash value based on applying a first hash function on the first object, computing a second hash value based on applying a second hash function on the first object, wherein the first hash value specifies a first bucket of the probabilistic data structure, and the second hash value specifies a second bucket of the probabilistic data structure, computing the fingerprint of the first object by applying the fingerprint function on the first object, and determining that the computed fingerprint of the first object is not present in the first bucket and the second bucket.

14. The database system of claim 13, wherein the fingerprint function is different from each of the first hash function and the second hash function.

15. The database system of claim 11, wherein the computing of the indicators is based on applying a hash function on the content of the unmodified objects.

16. The database system of claim 15, wherein the instructions are executable on the one or more processors to:

compute the fingerprints of the unmodified objects based on applying a fingerprint function on the content of the unmodified objects, wherein the fingerprint function is different from the hash function.

17. The database system of claim 11, wherein the instructions are executable on the one or more processors to:

allow removal of the first version of the first object in response to determining that the first object has been modified and the first version of the first object satisfies a removal criterion.

18. The database system of claim 11, wherein the probabilistic data structure is a cuckoo filter.

19. A method of a database system comprising a hardware processor, comprising:

based on receiving a query to access a table, accessing a plurality of objects containing data of the table, wherein the plurality of objects are stored in a remote object store;

based on receiving a query to change data in a first object of the plurality of objects, changing, by the database system, the first object by specifying the first object prior to the change as a first version of the first object, and creating a second version of the first object after the change;

identifying unmodified objects of the plurality of objects;

maintaining metadata identifying the unmodified objects, wherein the metadata comprises a probabilistic data structure comprising entries containing fingerprints of the unmodified objects;

adding, by the database system, the fingerprints of the unmodified objects to the probabilistic data structure by computing indicators of locations where the fingerprints are to be added, each indicator of the indicators based on content of a respective unmodified object of the unmodified objects; and during a garbage collection process when deciding whether to remove a given object of the plurality of objects, accessing the metadata to determine whether the given object has been modified, and preventing removal of the given object based on determining that the given object is unmodified.

20. The method of claim 19, wherein a fingerprint of the fingerprints is produced based on applying a fingerprint function on content of a respective unmodified object, and during the garbage collection process, the method comprising:

determining that the first object has been modified based on determining that the fingerprint of the first object is not in the probabilistic data structure; and determining that a second object of the plurality of objects is unmodified based on determining that a fingerprint of the second object is in the probabilistic data structure.

\* \* \* \* \*